United States Patent
Korpela et al.

(10) Patent No.: US 6,778,521 B1
(45) Date of Patent: Aug. 17, 2004

(54) METHOD FOR USING EFFECTIVELY THE BROADCAST CAPACITY IN A CELL

(75) Inventors: Mikko Korpela, Raahe (FI); Arto Pussinen, Oulu (FI); Jukka Ranta, Salo (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/223,531

(22) Filed: Dec. 30, 1998

(30) Foreign Application Priority Data

Jan. 5, 1998 (FI) .................................................. 980014
Jul. 27, 1998 (FI) .................................................. 981663

(51) Int. Cl.[7] .................................................. H04J 3/00
(52) U.S. Cl. ........................ 370/345; 455/434; 375/132
(58) Field of Search ............................... 370/329, 264, 370/331, 341, 337, 347, 236, 328, 332, 345, 326, 330, 468; 455/464, 450, 434; 375/132, 267, 299, 347

(56) References Cited

U.S. PATENT DOCUMENTS

| | | | |
|---|---|---|---|
| 4,527,284 A | 7/1985 | Rottger | 455/33 |
| 4,850,033 A | 7/1989 | Eizenhofer et al. | 455/56 |
| 5,042,082 A * | 8/1991 | Dahlin | 370/332 |
| 5,081,704 A * | 1/1992 | Umeda et al. | 370/330 |
| 5,396,653 A | 3/1995 | Kivari et al. | 455/88 |
| 5,430,740 A | 7/1995 | Kivari et al. | 371/37.1 |
| 5,442,809 A | 8/1995 | Diaz et al. | 455/54.1 |
| 5,446,364 A | 8/1995 | Naskali | 320/2 |
| 5,502,721 A * | 3/1996 | Pohjakallio | 370/336 |
| 5,511,110 A * | 4/1996 | Drucker | 370/336 |
| 5,537,395 A * | 7/1996 | Alles et al. | 370/236 |
| 5,539,748 A | 7/1996 | Raith | 370/95.1 |
| 5,570,353 A | 10/1996 | Keskitalo et al. | 370/18 |
| 5,570,369 A | 10/1996 | Jokinen | 370/95.3 |
| 5,577,024 A | 11/1996 | Malkamaki et al. | 370/18 |
| 5,606,548 A | 2/1997 | Vayrynen et al. | 370/252 |
| 5,625,274 A | 4/1997 | Naskali | 320/23 |
| 5,625,629 A * | 4/1997 | Wenk | 340/7.43 |
| 5,648,711 A | 7/1997 | Hakkarainen | 320/2 |
| 5,708,656 A | 1/1998 | Noneman et al. | 370/320 |

(List continued on next page.)

FOREIGN PATENT DOCUMENTS

| | | |
|---|---|---|
| EP | 0 415 502 A2 | 6/1991 |
| EP | 0 762 788 A2 | 3/1997 |
| EP | 0796025 A2 | 9/1997 |
| WO | WO 94/08432 | 4/1994 |
| WO | WO 95/12936 * | 5/1995 |
| WO | WO 95/19687 | 7/1995 |
| WO | WO 95/26112 | 9/1995 |
| WO | WO 95/31878 * | 11/1995 |
| WO | WO 96/10895 | 4/1996 |
| WO | WO 97/36387 | 10/1997 |

OTHER PUBLICATIONS

Finnish Official Action.
Integrated Alerting and System Broadcast Channel For A Wireless Access System, pp. 157–163.
The GSM System, XP–002059289, 9 pages.
European Telecommunication Standard, ETS 300 940, Apr. 1997.

*Primary Examiner*—Chi Pham
*Assistant Examiner*—Derrick W. Ferris
(74) *Attorney, Agent, or Firm*—Perman & Green, LLP

(57) ABSTRACT

The transmission of control information from a base station to at least one mobile station in the cell of a cellular radio system takes place using a first channel and a second channel. At a first moment of time, there is an indication on the first channel about the location of the piece of control information on the second channel. At a second moment of time, later than said first moment, the piece of control information is transmitted on the second channel.

5 Claims, 3 Drawing Sheets

U.S. PATENT DOCUMENTS

| | | | |
|---|---|---|---|
| 5,726,981 A | 3/1998 | Ylitervo et al. | 370/332 |
| 5,745,503 A | 4/1998 | Kuusinen | 371/37.1 |
| 5,760,568 A | 6/1998 | Naskali | 320/5 |
| 5,764,632 A | 6/1998 | Ylitervo | 370/337 |
| 5,778,318 A * | 7/1998 | Talarmo et al. | 455/452.1 |
| 5,790,534 A | 8/1998 | Kokko et al. | 370/335 |
| 5,790,551 A * | 8/1998 | Chan | 370/458 |
| 5,794,156 A | 8/1998 | Alanara | 455/517 |
| 5,802,465 A | 9/1998 | Hamalainen et al. | 455/403 |
| 5,821,735 A | 10/1998 | Scharff | 320/125 |
| 5,878,038 A * | 3/1999 | Willey | 370/335 |
| 5,920,547 A * | 7/1999 | Werth | 370/280 |
| 6,094,429 A * | 7/2000 | Blanchette et al. | 370/347 |
| 6,108,325 A * | 8/2000 | Stephanson et al. | 370/337 |
| 6,108,550 A * | 8/2000 | Wiorek et al. | 370/329 |
| 6,137,772 A * | 10/2000 | Turcotte et al. | 370/329 |
| 6,226,279 B1 * | 5/2001 | Hansson et al. | 370/329 |
| 6,236,646 B1 * | 5/2001 | Beming et al. | 370/335 |
| 6,252,865 B1 * | 6/2001 | Walton et al. | 370/335 |
| 6,317,595 B1 * | 11/2001 | St. John et al. | 455/417 |
| 6,418,127 B1 | 7/2002 | Laurent | 370/311 |
| 6,522,657 B1 * | 2/2003 | Wahl | 370/436 |
| 6,532,227 B1 * | 3/2003 | Leppisaari et al. | 370/348 |

* cited by examiner

| FRAME | 1 | 2 | 3 | 4 | 5 | 6 | 7 | 8 | 9 |
|---|---|---|---|---|---|---|---|---|---|
| PDU 1 | × | × | × | × | × | × | × | × | × |
| PDU 2 | × |   |   | × |   |   | × |   |   |
| PDU 3 | × |   | × |   | × |   | × |   | × |
| PDU 4 |   | × |   |   |   | × |   |   |   |

METHOD FOR USING EFFECTIVELY THE BROADCAST CAPACITY IN A CELL

TECHNICAL FIELD

The invention concerns the technology of broadcasting an amount of general information to a multitude of radio receivers in a way that uses effectively the radio resources that are available. Especially the invention concerns the application of such technology in a cellular radio network.

BACKGROUND OF THE INVENTION

In cellular networks there is commonly known the concept of cell broadcasting. It means that the base station of a cell transmits some information that is meant to be received by all mobile stations within the reach of the base station, or at least by a significant number of them. In a cell of a typical prior art cellular radio network there is determined a so-called common control channel or a BCCH (Broadcast Control Channel) that is receivable by all mobile stations in the cell. Although BCCH is a reserved name of a channel in a particular second generation cellular radio network (the GSM; Global System for Mobile telecommunications) it is used here as the general denomination of a common control channel without limiting the scope of the discussion to any particular system. The BCCH is used to convey information about e.g. the identity of the neighboring cells and their BCCH frequencies so that a mobile station may monitor the level of power it receives on those frequencies. A significant rise in the BCCH power level of a neighboring cell indicates that the mobile station is moving towards a position where a handover or cell reselection to the neighboring base station will be performed.

At the time of filing this patent application the third generation of cellular radio networks is under specification. Already it is seen that the amount of information that should be transmitted on a BCCH or the like will eventually be larger in the third generation systems than in the present second generation systems. For example, at a certain location there may be an overlap of cells from a macrocell RAN (Radio Access Network) and a nanocell RAN, whereby the mobile station should be informed not only about the identities of the neighboring cells but also about their characteristics (highest possible rate of transmitted user data, available modulation methods etc.) so that the mobile station could determine, which one of the neighboring and/or overlapping cells would be the best possible candidate for a handover or cell reselection.

A natural solution to handle the increasing amount of information to be broadcast is to increase the capacity of the BCCH by for example giving it more bandwidth or transmission power whereby in the latter case the applied channel coding could be reduced. However, radio resources (time, frequency, power) are scarce in a cell, so giving more capacity to a common channel reduces the capacity available for dedicated channels. Additionally the amount of information to be broadcast may vary from one cell to another, because not everywhere in the network are there numerous neighboring or overlapping cells, the characteristics of which should be transmitted. If a very large portion of the available capacity is given to the BCCH, it may happen that in many cells a significant portion of this capacity is underutilized while simultaneously some connection setup requests must be turned down because all capacity available for dedicated channels is occupied. Even in areas where there actually is a lot of BCCH information to be transmitted, some BCCH capacity should be reserved for future additions and this capacity would be underutilized everywhere at least during the initial service life of the system.

From the patent U.S. Pat. No. 4,850,033 there is known a method in which a transmission channel of each base station is assigned as a simplex message transmission channel in which a given base station transmits to the mobile stations information describing the structure of the control channels. Such information includes references to message transmission channels of adjoining base stations, and references to one or more control channels assigned to the given base station. The message transmission channels are thus at a higher level in the hierarchy of references than the control channels. Access by several different kinds of subscriber sets and different services can be provided by transmitting a relatively small number of references.

From the Finnish patent application number FI 980014 there is known a method in which the otherwise unused capacity of a paging channel is used to transmit information logically belonging to other channels. Since the mobile stations must listen to the paging channel regardless of whether there are paging messages or not, the periods during which their receivers are switched on can this way be utilized better than just for listening to an empty paging channel.

SUMMARY OF THE INVENTION

It is an object of this invention to present a method and a system for enabling the transmission of a variable amount of common control data in a cell. It is a further object of this invention that in a method and a system according to the invention, future additions to the common control arrangement would be possible without initially reserving significant capacity for them.

The objects of the invention are achieved by dividing the common control information into parts that are transmitted separately, and indicating, where the different parts can be found in the time and frequency co-ordinate system of the cell.

The method according to the invention is characterised in that it comprises the steps of

- at a first moment of time, indicating on the first channel the location of the piece of control information on the second channel and
- at a second moment of time, later than said first moment, transmitting the piece of control information on the second channel.

The general inventive idea of dividing the control channel information into parts that are separately available may be realized using two alternative approaches or a hybrid approach containing features from both of the two alternatives. The first alternative approach is to define a group of different information unit types, designated as Protocol Data Units or PDUs in an exemplary manner, and to set up a transmission schedule which relates the PDU types to certain frames of the control channel information. The most important PDU type will appear most often, preferably in each frame containing control channel information, and the other PDU types will appear in every second frame, every third frame or generally in every Nth frame according to PDU type, where N is an integer. The schedule of appearance of different PDU, types and the type of information contained within each PDU type will be communicated to the mobile stations, so they may decide, which PDU types they need to receive.

The second alternative is to send a part of the common control information on some other channel and indicating in a common control channel frame where among the other channels the additional common control information can be found. The information units contained within a common control channel frame and indicating the location of some other common control information are called pointers. The location indicated by a pointer may be for example in some traffic channel configured to be a point-to-multipoint channel. In an advantageous embodiment of the invention the pointer indicates not only the location but also the type of information contained within some other channel so that the mobile stations may decide, whether they need to receive the additional information or not.

A hybrid approach is to define a certain common control channel PDU type as a "pointer PDU" containing pointers, as in the second alternative discussed above, and including this PDU type among the other PDU types defined according to the first alternative discussed above. The pointer PDU will then appear regularly in every Mth common control channel frame, where M is an integer defined statically in the system specifications or dynamically, either by the base station transmitting the control channel information or by the radio network controller controlling the operation of the base station.

BRIEF DESCRIPTION OF THE DRAWINGS

The novel features which are considered as characteristic of the invention are set forth in particular in the appended Claims. The invention itself, however, both as to its construction and its method of operation, together with additional objects and advantages thereof, will be best understood from the following description of specific embodiments when read in connection with the accompanying drawings.

DETAILED DESCRIPTION OF THE INVENTION

Figures 1, 2:
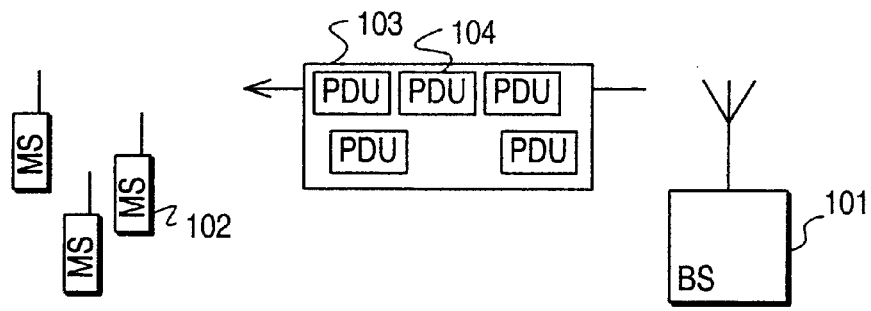
FIG. 1 illustrates a system according to the first alternative approach of the invention.
FIG. 2 illustrates an exemplary schedule of PDU types in the system of FIG. 1.

In FIG. 1, base station (BS) 101 transmits control information to a multitude of mobile stations 102. The contents of the control information are not limited by the invention, but it is understood that it is by nature such information that a mobile station needs for operating in the cell of base station 101 and for preparing for a handover or a cell reselection to some neighboring and/or overlapping cell. Typical control information contains information giving identification of the current network, location area and cell; information used for candidate cell measurements for handover and cell reselection procedures; information describing the current control channel structure; information controlling the random access channel utilization; and information defining different options supported within the cell. In the following, control information in general is called BCCH data for brevity.

For conveying BCCH data from the base station to the mobile stations a control information channel 103 has been specified as occupying certain predetermined parts of the time and frequency co-ordinate system of the cell. If CDMA (Code Division Multiple Access) or other spread spectrum technology is used in the cellular radio system, also the spreading code used to spread the control information must be used as a co-ordinate that defines the radio resources reserved for the control information channel. The control information channel is called the BCCH for short, although it should be understood that denominations like BCCH used in this patent application do not limit the applicability of the invention to any specific cellular radio systems.

BCCH data is arranged into mutually independent units called Protocol Data Units or PDUs 104. On the other hand, transmission in general is arranged to take place in transmission frames, the temporal duration of which is constant. According to the first alternative approach of the invention there are several PDU types, known as PDU type 1, PDU type 2 and so on, and the appearance of PDUs representing a certain PDU type follows a certain schedule with regard to the transmission frames. FIG. 2 is an exemplary schedule for PDU types 1, 2, 3 and 4. The frame numbers at the top of FIG. 2 are proportional so that in a certain predetermined overall frame structure like a superframe or hyperframe there can be defined a certain frame 1, frame 2 and so on until after frame 9 the numbering cycle is restarted from frame 1 until all the frames in the frame structure have been numbered. It can be seen from FIG. 2 that PDUs of type 1 appear in each frame, PDUs of type 2 appear in every third frame starting from frame 1, PDUs of type 3 appear only in odd-numbered frames and PDUs of type 4 appear only in frames 2 and 6.

For the method to be flexibly adaptable to different amounts of BCCH data, the schedule of appearance of different PDU types is not fixedly specified but it can vary from one cell to another. The information about which types of PDUs are transmitted and in which frames is communicated from the base station to the mobile stations by using a certain PDU known as the channel configuration PDU. Alternatively each PDU may contain an information element indicating the period of appearance of this PDU type in frames (when the PDU type appears periodically) or the proportional frame numbers in which this PDU type appears.

In those frames where different PDU types appear they are most advantageously transmitted in order of ascending frame type number, e.g. in frame 1 of FIG. 2 the PDUs are transmitted in the order of type 1 first, type 2 second and type 3 third. The rationale for arranging the PDUs into a well-known transmission order is to give the mobile stations the possibility of deciding beforehand, which PDUs they want to receive. Having the receiver switched on in a mobile station consumes energy depleting the battery of the mobile station, so it is advantageous to have the receiver of a mobile station switched off always when there is nothing important to be received.

The capacity reserved for the BCCH limits the number of PDUs that can be transmitted within each transmission frame. It is on the responsibility of the base station or the radio network controller controlling its operation to arrange the PDUs into the available capacity so that all BCCH data will eventually be transmitted. Typically in an area where there is a large amount of BCCH data to be transmitted the base station or radio network controller will increase the number of frames between successive transmissions of PDUs of certain type so that effective bit rate available for the transmission of the information conveyed in PDUs of that type will be lower than in areas where the amount of BCCH data to be transmitted is small.

Figure 3:
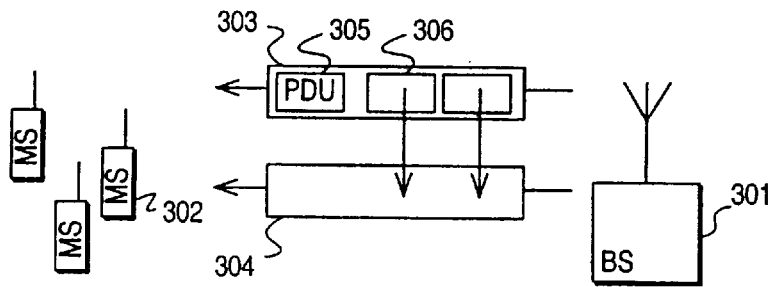
FIG. 3 illustrates a system according to the second alternative approach of the invention.

FIG. 3 illustrates a system according to the second alternative approach of the invention. Base station 301 again transmits control information to a multitude of mobile stations 302, for which a control information channel 303 has been specified, but there are also specified other channels called point-to-multipoint (PTM) traffic channels 304 between the base station and the mobile stations. A base station or a radio network controller may specify a certain channel or a number of channels as point-to-multipoint traffic channels when needed by transmitting a respective channel configuration message to the mobile stations. If no such specification is made, the respective capacity is available for dedicated (point-to-point) traffic channels.

Figure 4:
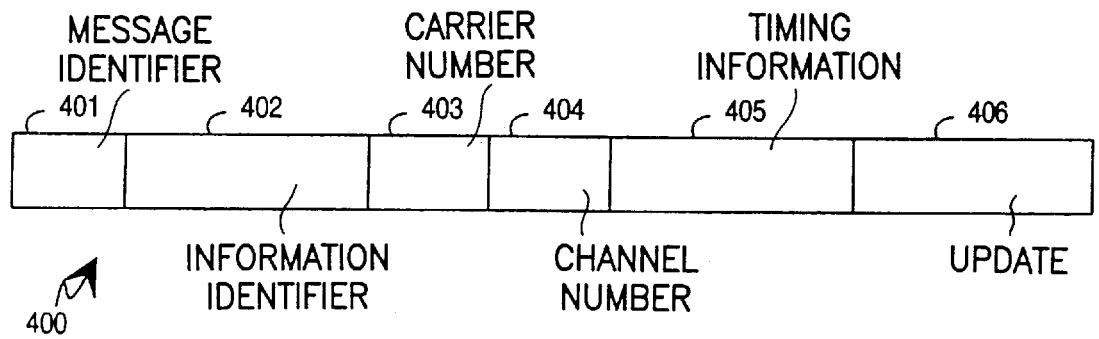
FIG. 4 illustrates the contents of an exemplary pointer used in the system of FIG. 3.

In FIG. 3 there is a certain minimum amount of BCCH data that is transmitted in respective PDUs 305 on the BCCH. The amount and content of this minimum amount of BCCH data depends on the cellular radio system to which the invention is applied, but it is expected that at least information giving identification of the current network, location area and cell, and information used for candidate cell measurements for handover and cell selection procedures are included in this category. The rest of the PDUs on the BCCH are so-called pointer PDUs 306 not containing actual BCCH data but only indications about what the respective actual BCCH data would contain and where in the channel configuration of the cell the actual BCCH data is found. FIG. 4 is a schematic representation of an exemplary pointer PDU 400. It consists of fields, the length of which is determined in bits and/or octets (groups of 8 successive bits).

The first field 401 is the Message Identifier field spanning the lengths of 1 to 2 octets and identifying the PDU as a pointer PDU. Its structure conforms to the structure of message identifiers determined for all so-called Layer 3 messages, referring to the protocol layer in a well-known OSI model (Open Structured Interface) into which the PDUs belong. The second field 402 is the Information Identifier field that identifies, what information is available at the point where the pointer PDU points to. A commonly agreed coding scheme will be needed to provide for standardized Information Identifier strings for different kinds of information. The proposed length of field 402 is 2 octets.

The third and fourth fields 403 and 404 identify the location where the pointer PDU points to. Field 403 is a one-octet long Carrier Number and field 404 is a one-octet long Channel Identifier. They identify the carrier (in a multifrequency system) or the spreading code (in a single-frequency spread spectrum system) and the channel in which the actual BCCH data is located. Field 405 contains the Timing Information which is used to indicate, when the BCCH data concerned will be available at the specified location. The proposed length of this field is 2 octets and several alternative time coding schemes are possible. For example the Timing Information may be a frame number in a superframe or a hyperframe, indicating the first frame in that larger aggregate of frames where the BCCH data will be available, together with a period code indicating the number of frames between successive appearances of the data within the superframe of hyperframe. The period code is naturally applicable only if the BCCH data concerned will appear periodically. Another possibility for indicating a certain frame in the Timing Information is to indicate the number of frames between the current frame and the first following frame containing the BCCH data concerned, again possibly combined with a period code. Other alternatives for using the Timing Information field are easily presented by a person skilled in the art.

The last field in FIG. 4 is the proposedly one-octet long Updated field 406. Its contents either tell whether there has been a change (addition, deletion or update of information) in the BCCH data concerned since it was last broadcast, or indicate a version number of successive updates in an ascending order. The reason for using such a field in the pointer PDU is to give the receiving end the possibility to decide, whether it needs to receive the BCCH data concerned or not. If the Updated field reveals that the information has not changed since the receiver received it for the last time, there is no need to switch on the receiver to receive the same information again.

The composition of a pointer PDU illustrated in FIG. 4 is naturally only exemplary. Other fields that it might include are for example a length indicator indicating the overall length of the pointer PDU (in case it is not constant) and other fields typical to Layer 3 messages. The lengths of the fields proposed above are probably somewhat too pessimistic; several effective coding schemes are known from the technology of Layer 3 messaging for reducing the length of separate fields. For example, a single bit could suffice for the Updated field, whereby its value would indicate whether the information has been updated during a certain passed time period or not.

After having received the pointer PDUs a mobile station analyses, which BCCH data it needs to receive, and tunes its receiver to the correct channel at the correct time for receiving the BCCH data. Alternatively the mobile station may inform its user about the need for downloading certain information conveyed as BCCH data, and ask for a permission to receive the BCCH data. This alternative is especially useful when the amount of data to be downloaded is large and its downloading would incur significant costs.

The flexibility of the second alternative approach to the invention, discussed above with reference to FIGS. 3 and 4, is readily seen. The base station or radio network controller may allocate capacity from a point-to-multipoint channel for the purposes of conveying BCCH data as needed, and cancel the allocations whenever the amount of BCCH data falls below a certain predetermined threshold. Although a point-to-multipoint-type traffic channel has been described above as the favorable medium for transmitting the actual BCCH data, a pointer PDU may basically point to any location in the channel allocation scheme of a cell or even to some location in some different set of communication resources available to the mobile stations. For example in the above-mentioned case where the mobile stations asks the user for a permission before downloading certain information conveyed as BCCH data, even a dedicated traffic channel could be used. After having received the permission from the user, the mobile station will then transmit a channel request to the base station and indicate in some specific message that it would like to receive certain information conveyed as BCCH data. A connection using a dedicated traffic channel will be established and the requested information will be transmitted to the mobile station that requested it.

A very important generalization of the invention is the possibility to have the pointer PDUs point to somewhere else than the channel allocation scheme of the cell. In a system where suitably equipped mobile stations have access to a packet-switched data transmission network the pointer PDU may point to a certain network address, like an Internet address. A mobile station that receives the pointer PDU and wants to receive the information identified in the pointer PDU will then send a packet to the indicated address, containing a request for downloading the information. The network server responsible for the resources behind said address will then send the requested data in packetized form to the mobile station. Here again the mobile station may ask its user for a permission before sending the packet containing the request.

Another important application of the pointer PDU approach is the scheduling of transmissions in order to balance the loading of the control information channels between rush hours and more quiet times. It is commonly known that during the very early hours in the morning the momentary need for both transmitted control information and reserved dedicated channels in the cells of a cellular radio system is very small, because a majority of the users are asleep and their mobile stations are stationary and idle if not totally switched off. During these times there is plenty of free capacity in the network so the transmission of even large amounts of information conveyed as BCCH data is possible. During active daytime a system according to this particular embodiment of the invention can transmit pointer PDUs indicating that large blocks of information are available for downloading next night or some other time in the future. If the nature of the information is such that the mobile stations do not need it right away, they can just memorize the announced future transmission time of the information and wait until something like 03.00 AM before downloading the information from a location somewhere within a point-to multipoint channel, pointed to by the pointer PDUs. On the other hand, during daytime the same information could be offered to users that need it immediately, whereby those users will have to request for an immediate transmission on a dedicated traffic channel—and probably pay more because their request and its fulfillment consume the radio resources of that cell.

Downloading the scheduled information from a previously announced point-to-multipoint channel at a previously announced time naturally requires that the mobile station will be switched on at the previously announced time. It could be useful to arrange for the User Interface (UI) of the mobile station to warn the user about the scheduled downloading if an attempt is made to power down the mobile station before the announced time.

Figure 5:
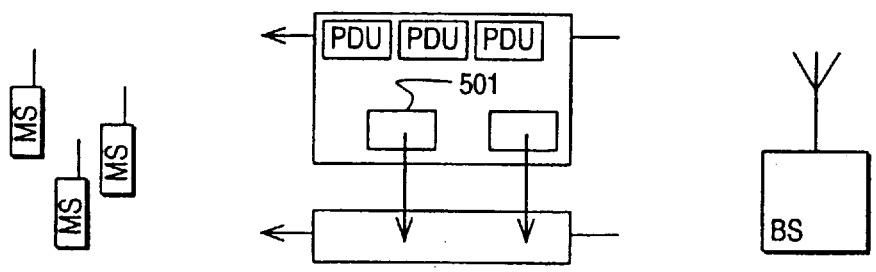
FIG. 5 illustrates a system according to the hybrid approach of the invention.

Next the hybrid approach to the invention will be briefly considered with reference to FIG. 5. In this approach pointer PDUs 501 will be used to inform the mobile stations about the location of some actual block of BCCH data like in the second approach discussed above. However, the pointer PDUs only appear as representatives of one PDU type, which has its own transmission schedule as in the first approach discussed above. BCCH data can be classified into a relatively large number of groups according to some indication of its importance and urgency. The most urgent and most important BCCH data will then be transmitted in each transmission frame, some less urgent data will be transmitted perhaps not more often than in every third transmission frame, and the least urgent BCCH data somewhere else in the channel structure, as indicated by pointer PDUs on the actual control channel.

Figure 6A:
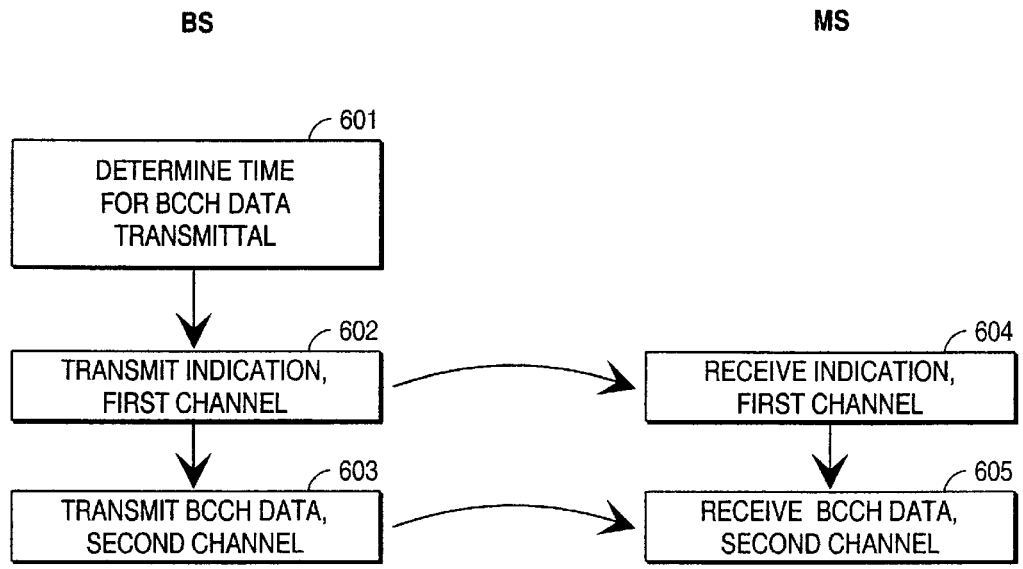
FIG. 6a illustrates a first embodiment of the method according to the invention and FIG. 6b illustrates a second embodiment of the method according to the invention.
Figure 6B:
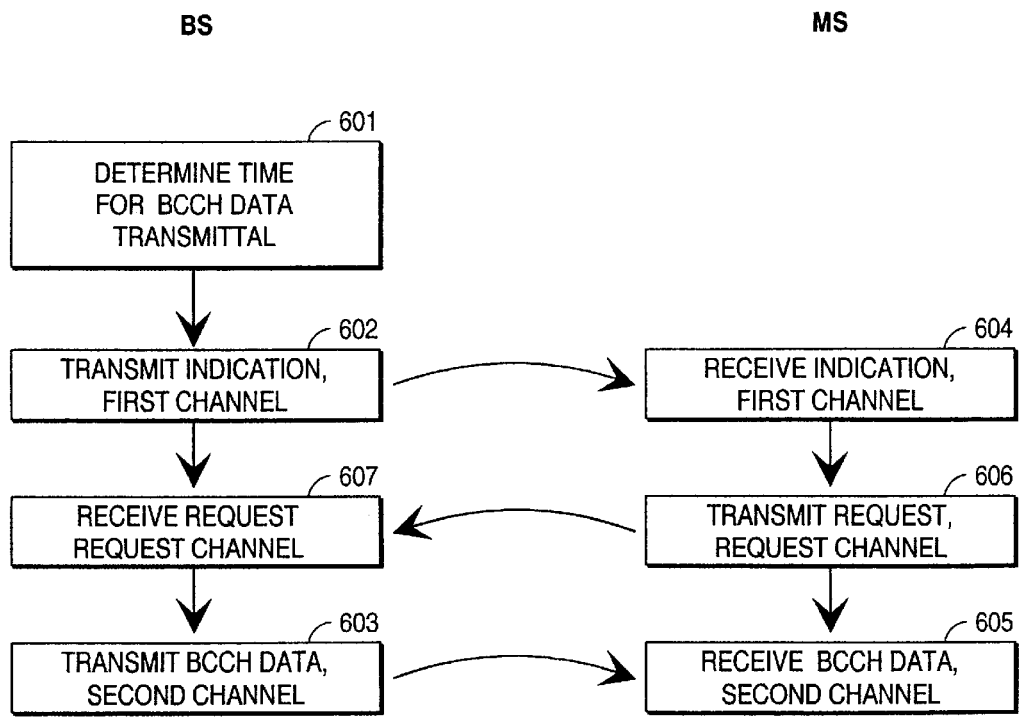

FIGS. 6a and 6b illustrate the operation of a Base Station (BS) and a Mobile Station (MS) according to the invention. The straight arrows indicate the propagation from one functional step to another in each device and the curved arrows indicate the mutual relations between transmit and receive functions. In FIG. 6a the base station goes through the functional steps 601, 602 and 603 regularly or according to the need of transmitting BCCH data on the second channel. After having received, at step 604, an indication about an incoming BCCH data transmission on the second channel the mobile station will prepare itself for reception and consecutively receive the BCCH data at step 605. In FIG. 6b there is the difference that the mobile station has to ask for the BCCH data transmission at step 606 (request received at step 607) before the base station will transmit.

If the mobile station is equipped to warn the user against powering down the mobile station before an already indicated BCCH data transmission will take place, the warning step will be found in FIGS. 6a and 6b somewhere after step 604 and before step 605.

The invention does not restrict the nature of the information sent directly on the BCCH or in some location pointed to by a pointer PDU on the BCCH. Typical examples of such information that has a volume large enough to justify the "enlarged BCCH" concept of the invention are software updates to the mobile stations and service provider information. The latter can include both information about the service providers whose services are available and description of the services themselves.

The invention is very well suited for a cellular radio system where additions to the offered services and functions are constantly made due to constantly ongoing development work. A "basic mode" mobile station only needs to know the timing used on the BCCH and the instructions for decoding a pointer PDU to be able to utilize those services and functions that had been specified at the moment when the mobile station left the facilities of its manufacturer and/or programmer. All information meant only for more advanced or more recently released mobile stations will appear as unidentified PDUs or unidentified information elements to the basic mode mobile station, whereby it ignores them and utilizes only those services and functions which it identifies and understands.

What is claimed is:

1. A method for transmitting a discrete piece of control information from a base station to at least one mobile station in the cell of a cellular radio system using a first channel and a second channel, comprising the steps of:

at a first moment of time, indicating on the first channel the exact location of the discrete piece of control information among all other pieces of information on the second channel, wherein the indicating step is performed on only one channel; and at a second moment of time, later than said first moment, transmitting the discrete piece of control information on the second channel;

wherein the first channel is a broadcast control channel and the second channel is a traffic channel of point-to-point type, and the method further comprises the step of between said first moment of time and said second moment of time, transmitting from a mobile station to the base station a request for transmitting the piece of control information.

2. A method for transmitting a discrete piece of control information from a base station to at least one mobile station in the cell of a cellular radio system using a first channel and a second channel, wherein the first channel is a broadcast control channel and the second channel is a traffic channel of point-to-point type, comprising the steps of:

at a first moment of time, indicating on the first channel the exact location of the discrete piece of control information among all other pieces of information on the second channel;

at a second moment of time, later than said first moment, transmitting the discrete piece of control information on the second channel; and between said first moment of time and said second moment of time, transmitting from a mobile station to the base station a request for transmitting the piece of control information;

wherein the piece of control information is located at a network address of a packet-switched data network, whereby the base station conveys said request to said network address and the transmission of the piece of control information follows the establishment of a packet-switched communication connection from said network address to the mobile station.

3. A method according to claim 2, wherein the first moment of time is during a period of high traffic and signalling load in the cellular radio system and the second moment of time is during a period of low traffic and signalling load in the cellular radio system.

4. A method according to claim 2, further comprising, between said first moment of time and said second moment of time, the step of informing the user of the mobile station about the intended reception of a piece of control information at said second moment of time.

5. A method for receiving a discrete piece of control information from a base station at a mobile station in the cell of a cellular radio system using a first channel and a second channel, comprising the steps of:

at a first moment of time, receiving an indication on the first channel concerning the exact location of the discrete piece of control information among all other pieces of information on the second channel;

at a second moment of time, later than said first moment, receiving the discrete piece of control information on the second channel; and between said first moment of time and said second moment of time, informing the user of the mobile station about the intended reception of a piece of control information at said second moment of time;

wherein said step of informing the user of the mobile station takes place as a response to an attempt by the user to power down the mobile station.

* * * * *